(12) United States Patent
Yu et al.

(10) Patent No.: US 11,126,764 B2
(45) Date of Patent: Sep. 21, 2021

(54) PHYSICS-BASED MODEL PARTICLE-FILTERING FRAMEWORK FOR PREDICTING RUL USING RESISTANCE MEASUREMENTS

(71) Applicant: Palo Alto Research Center Incorporated, Palo Alto, CA (US)

(72) Inventors: Hong Yu, San Jose, CA (US); Ajay Raghavan, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 400 days.

(21) Appl. No.: 16/148,707

(22) Filed: Oct. 1, 2018

(65) Prior Publication Data

US 2020/0104437 A1 Apr. 2, 2020

(51) Int. Cl.
*G06F 7/60* (2006.01)
*G06F 30/20* (2020.01)
*G06N 7/00* (2006.01)
*G06F 30/25* (2020.01)
*G06F 111/10* (2020.01)

(52) U.S. Cl.
CPC .............. *G06F 30/20* (2020.01); *G06F 30/25* (2020.01); *G06N 7/005* (2013.01); *G06F 2111/10* (2020.01)

(58) Field of Classification Search
CPC ........................................................ G06F 30/20
USPC ............................................................. 703/2
See application file for complete search history.

(56) References Cited

U.S. PATENT DOCUMENTS

2012/0223727 A1 9/2012 Gao et al.

FOREIGN PATENT DOCUMENTS

EP 3255588 A1 12/2017
WO 2014107303 A1 7/2014

*Primary Examiner* — Timothy A Mudrick
(74) *Attorney, Agent, or Firm* — Shun Yao; Park, Vaughan, Fleming & Dowler LLP

(57) ABSTRACT

One embodiment can provide a system for estimating a useful life of a load-bearing structure at least partly made of a conductive material. During operation, the system establishes a physics-based damage model for the load-bearing structure, performs a dynamic measurement to obtain at least one conductive property of the load-bearing structure as a function of fatigue cycles, estimates parameters of the physics-based damage model based on the measured conductive property, and estimates the useful life of the load-bearing structure based on the estimated parameters of the physics-based damage model.

17 Claims, 12 Drawing Sheets

PHYSICS-BASED MODEL PARTICLE-FILTERING FRAMEWORK FOR PREDICTING RUL USING RESISTANCE MEASUREMENTS

BACKGROUND

Field

This disclosure is generally related to a system and method for fault diagnosis and prognosis. More specifically, this disclosure is related to implementing physics-based modeling for predicting a remaining useful life (RUL) of engineering structures or equipment, such as load-bearing cables.

Related Art

Detection and diagnosis of mechanical faults in mechanical and electrical equipment can be very important in many industries. Correct prediction of a total useful life (TUL) or remaining useful life (RUL) of such equipment can have great financial impact. For example, cables carrying data or electrical charges are essential in many industries, including the telecommunication industry, automotive industry, healthcare industry, power generation and distribution industry, etc. Failures of a load-bearing cable may sometimes lead to catastrophic outcomes.

There are two types of approach for fault diagnosis, including model-based diagnostic techniques and data-driven diagnostic techniques. In model-based approaches, a model of the machinery being diagnosed (i.e., the system) can be provided to the diagnosis engine. Moreover, the diagnosis engine can receive values of the parameters of the model and some of the input and output values. The goal of the model-based diagnosis is to determine, from only the system model and available input/output values, whether a fault is present, and if so, the cause of the fault. This process can require a great amount of computation resources. On the other hand, data-driven approaches use statistical models (e.g., classifiers or regressors) trained with labeled data that describe the behavior of the system under different fault modes. This data-driven approach requires a large amount of data in order to build meaningful statistical models. However, such a condition may not be easily satisfied.

Many different types of electrical or mechanical equipment use materials with various conductive (e.g., thermally, electrically, or magnetically) properties. Examples of such materials can include metals, alloys, and carbon composites. Some applications (e.g., signal and charge cables) directly use the conductive property to fulfill designed functions. Other applications (e.g., carbon composites used on aircraft as structural materials) may only use a particular material due to its superior mechanical properties. Materials in these engineering applications are subject to cyclic loading, such as vibrations (e.g., for harness cable used in the vehicles) and electric charging cycles (e.g., for electrical cables), which affect fatigue damage evaluation.

SUMMARY

One embodiment can provide a system for estimating a useful life of a load-bearing structure at least partly made of a conductive material. During operation, the system establishes a physics-based damage model for the load-bearing structure, performs a dynamic measurement to obtain at least one conductive property of the load-bearing structure as a function of fatigue cycles, estimates parameters of the physics-based damage model based on the measured conductive property, and estimates the useful life of the load-bearing structure based on the estimated parameters of the physics-based damage model.

In a variation on this embodiment, the physics-based damage model comprises an analytical portion modeling a physical structure of the load-bearing structure and a semi-analytical portion modeling damage degradation.

In a variation on this embodiment, the at least conductive property comprises one or more of: an electrical resistance, a thermal resistance, and a magnetic resistance.

In a variation on this embodiment, estimating the parameters of the physics-based damage model comprises applying a Bayesian inference-based filtering algorithm.

In a further variation, the Bayesian inference-based filtering algorithm comprises a particle-filtering algorithm.

In a variation on this embodiment, the estimated parameters of the physics-based damage model comprise a damage variable, a parameter indicating the damage growth rate, and a parameter indicating the total useful life.

In a variation on this embodiment, the load-bearing structure comprises a load-bearing cable.

One embodiment can provide a system for monitoring structural damage in a load-bearing structure at least partly made of a conductive material. During operation, the system establishes a physics-based damage model for the load-bearing structure, performs a dynamic measurement to obtain at least one conductive property of the load-bearing structure as a function of fatigue cycles, and infers a state of damage and a damage growth rate by estimating parameters of the physics-based damage model based on the measured conductive property.

BRIEF DESCRIPTION OF THE FIGURES

In the figures, like reference numerals refer to the same figure elements.

DETAILED DESCRIPTION

Figure 1:
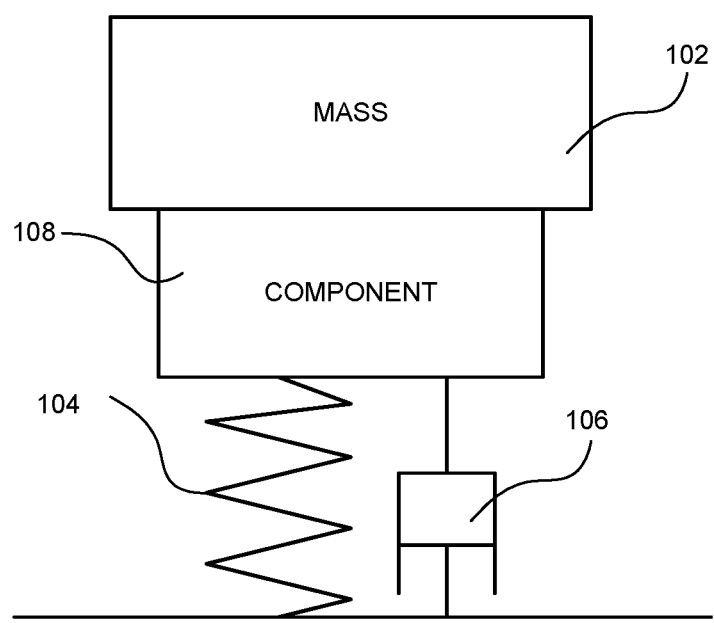
FIG. 1 illustrates an exemplary grey-box model for a mechanical system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of performing fault diagnosis and prognosis on mechanical and/or electrical equipment (e.g., load-bearing cables) that involve electrically, thermally, or magnetically conductive materials. More specifically, the system can map the mechanical life of a piece of equipment (e.g., a cable) to its conductive properties (e.g., electrical, thermal, or magnetic resistance). For example, by measuring the electrical resistance of a cable, the system can predict the TUL or RUL of the cable. In some embodiments, a physics-based model can be used to link the mechanical and conductive properties of the equipment, and a semi-analytical damage accumulation module can be established based on both analytical modeling and experimental investigations. Moreover, the system integrates the physics-based model with a particle-filtering framework to estimate the model parameters, thus being capable of predicting TUL or RUL.

Physics-Based Model

Physics-based modeling can be used to capture the essential physics of a real-life problem. Such modeling can be used to predict the behavior of a system under conditions that have not yet been studied or for which data is not available yet. There are three types of physics-based models, the white-box model, the black-box model, and the grey-box model.

In a white-box model, the system can be decomposed into sub-components based on its physical structure. For example, a multi-strand cable can be decomposed into multiple strands. The physical behavior of each component (e.g., a single strand of cable) can be represented by a set of analytical equations (e.g., differential equations). For example, the electrical conduction of a single strand of cable can be expressed using analytical equations. The overall behavior can result from interactions among the sub-components. The parameters of the white-box model have physical meanings and are either chosen at design time (e.g., technical specifications) or estimated from data (e.g., when the system is in use).

When little knowledge of the internal mechanisms of the system is available, it's impossible to implement white-box models. Instead, a black-box model, which represents a mapping between the inputs and outputs of the system, can be used. In the black-box model, the parameters have no physical meanings. Various machine-learning techniques, such as deep-learning neural networks can be used to infer parameters of the black-box model. For example, the degradation rate of a cable can be inferred using neural networks based on loading and damage conditions.

In many situations, not all details about the inner workings of the system are known. In such a situation, a model for the "missing" part can be built from experimental data. Such a model can be referred to as a grey-box model. Grey-box modeling is also known as semi-physical modeling, where the system can be described using a set of analytical equations representing known physical behaviors of sub-components in the system and one or more additional non-analytical equations representing unknown physical behaviors.

FIG. 1 illustrates an exemplary grey-box model for a mechanical system, according to one embodiment. Mechanical system 100 can include a mass 102, a spring 104, and a damper 106. The dynamics of spring 104 and damper 106 are well known. In addition, mechanical system 100 can also include a component 108, the dynamics of which are not known but can be inferred from experimental data. Using grey-box modeling, one can describe mechanical system 100 using the following set of equations.

$$m\ddot{x} = mg - F_i \quad (1)$$

$$F_i = T(F) \quad (2)$$

$$F = F_1 + F_2 \quad (3)$$

$$F_1 = kx \quad (4)$$

$$F_2 = c\dot{x} \quad (5)$$

In the above equations, m is the mass, x is the displacement, g is the gravitational constant, Fs are forces, and k and c are spring and damper constants, respectively. The dynamics of the mass, spring, and damper can be expressed using well-defined equations (i.e., equations (1), (4), and (5)). However, the dynamics of component 108 are not known, and the function T(F) in equation (2) can only be derived from experimental data. As one can see, equations used to describe the model are a mix of analytic and non-analytic equations. Many real-life systems can be described using such a hybrid model. Using weight-bearing cables as an example, one may know the general form and trend of degradation of the cables; however, the degradation rate of the cables needs to be inferred from experimental data. In some embodiments, inferring such information can involve obtaining the electrical properties of the cable.

Figure 2:
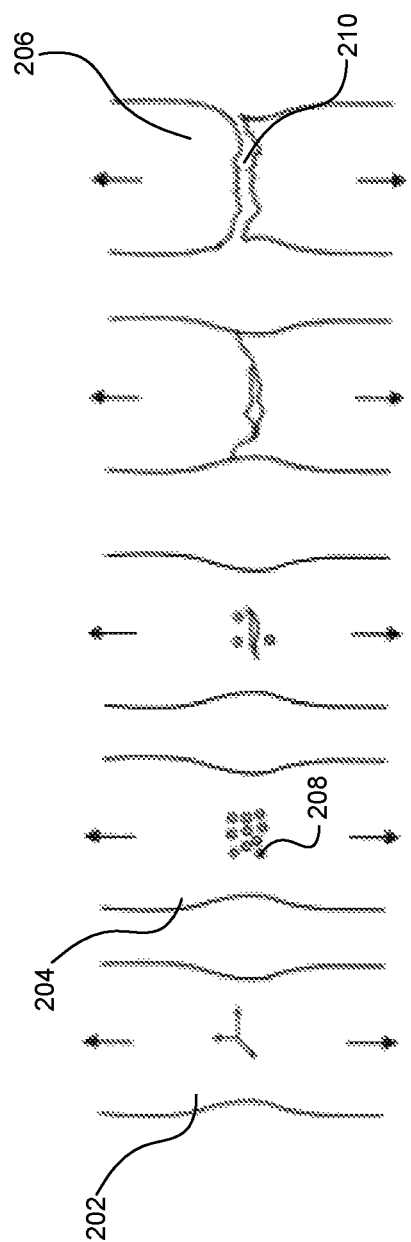
FIG. 2 illustrates the effective load-bearing area of a cable under various crack conditions.

Various conductive properties (e.g., electrically conductive, thermally conductive, or magnetically conductive property) can be tightly linked to material structure at both micro and macro scale. Damages in the material can result in change of load-bearing capability as well as the electrical, thermal, and magnetic conduction paths. FIG. 2 illustrates the effective load-bearing area of a cable under various crack conditions. More specifically, FIG. 2 shows a number of cables (e.g., cables 202 and 204) in various degradation conditions. From left to right, the degradation gets worse and worse, and cable 206 is completely broken. As one can see from FIG. 2, the microcracks or cracks in each cable (e.g., microcrack 208 in cable 204 or crack 210 in cable 206) can affect the cross-sectional area of the cable. Because the current-conducting cross-sectional area is equivalent to the load-bearing (or weight-bearing) cross-sectional area of the cable, those microcracks or cracks not only reduce the load-bearing cross-sectional area in the cable, but also reduce the conducting cross-sectional area of the cable. Therefore, electrical, thermal, or magnetic resistance measurements may provide information associated with damages in the equipment (e.g., cables). Compared to mechanical measurements (e.g., measuring strains or stress), electrical or thermal measurements can be simpler to implement without interrupting the service of the equipment, thus enabling long-term fault monitoring.

Material or structural damages can often grow with time, leading to a progressive internal deterioration of the material. One may define a normalized damage variable D, where D=0 refers to the non-damaged state and D=1 refers to the completely failed (e.g., broken) state. Based on the analogy between electrical conduction paths and mechanical load-bearing, the damage variable can also be expressed as a function of the cross-sectional area:

$$D = 1 - \frac{A}{A_0},$$

where $A_0$ is the effective cross-sectional area of a specimen (e.g., a cable) before damage, and A is the current effective cross-sectional area of the specimen which carries the loads and conducts electricity. Because the cross-sectional area of a cable can affect current conducting, in some embodiments, the ratio between the cross-sectional areas can be replaced with measured electrical resistance, which is inversely proportional to the cross-sectional area. Therefore, the damage variable can be expressed as:

$$D = 1 - \frac{R_0}{R} = 1 - 1/r, \quad (6)$$

where $R_0$ is the electrical resistance of the cable before damage, and R is the current electrical resistance, and normalized resistance $$r = \frac{R}{R_0}.$$

In addition to electrical resistance, thermal or magnetic resistance can also be used for calculating the damage variable. The following discussion uses electrical resistance measurement as an example for estimating the damage variable, but the scope of this disclosure is not limited to the electrical resistance measurement.

Fatigue-induced structural damages often accumulate over time. As discussed previously, fatigue-damage-cumulative models of equipment typically require both analytical and non-analytical (or semi-analytical) formulae based on continuum damage mechanics theory or experimental investigations. Paris' law has been widely used to describe crack growth in homogeneous material. More specifically, Paris' law uses micro-scale structural properties, such as the crack size and localized stress intensity. Paris' law can be expressed as:

$$\frac{d\alpha}{dN} = C(\Delta K)^m, \quad (7)$$

where $\alpha$ is the half crack length, N is the number of fatigue cycles (e.g., loading cycles), $$\frac{d\alpha}{dN}$$

is the rate of change of the half crack length with respect to the number of fatigue cycles, C is the material constant of the crack growth equation and a crack geometry, m is an exponent that can be selected based on the material type, and $\Delta K$ is the range of the stress intensity factor during the fatigue cycle.

Inspired by Paris' law, one can derive a power-law formula for a micro-scale damage variable (i.e., D) as:

$$D = 1 - \left(1 - \frac{N}{N_f}\right)^{-\alpha}, \quad (8)$$

where $\alpha$ and $N_f$ are model coefficients. $D = D_c \le 1$ corresponds to the failure state, where $D_c$ is the critical damage degree that is material-dependent and can be determined from experiments. Substituting the expression of D into the power-law formula, one can obtain a set of equations describing the damage accumulation model. More specifically, substituting equation (6) into equation (8), one can obtain:

$$\log(r) = \alpha \log\left(1 - \frac{N}{N_f}\right). \quad (9)$$

A differential equation regarding D can also be obtained through equation (8):

$$\frac{dD}{dN} = -\frac{\alpha}{N_f}(1-D)^{\frac{\alpha+1}{\alpha}}. \quad (10)$$

This damage accumulation model links the damage variable D to normalized electrical resistance r, which is measurable.

Figure 3:
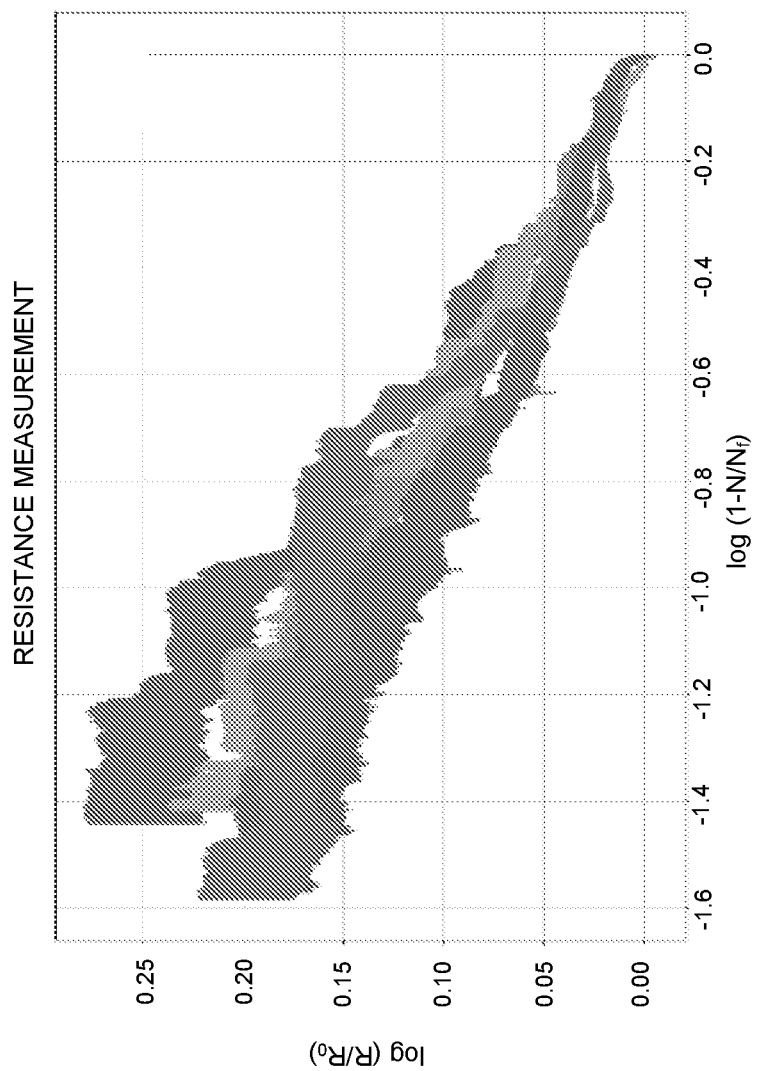
FIG. 3 shows the resistance measurement result of a cable, according to one embodiment.

FIG. 3 shows the resistance measurement results of a cable, according to one embodiment. As one can see from the drawing, a nearly linear trend is shown, as indicated by equation (9). The end of the curve (i.e., r=1) represents the situation of a completely broken cable. Given the inputs (i.e., the number of fatigue cycles N) and outputs (e.g., measurements of r) of the model, one can estimate the model parameters (i.e., [D, $\alpha$, $N_f$]), where D is the damage variable, $\alpha$ reflects the damage growth rate, and $N_f$ reflects the total useful life in terms of the number of fatigue cycles.

Particle-Filtering Framework

Figure 4:
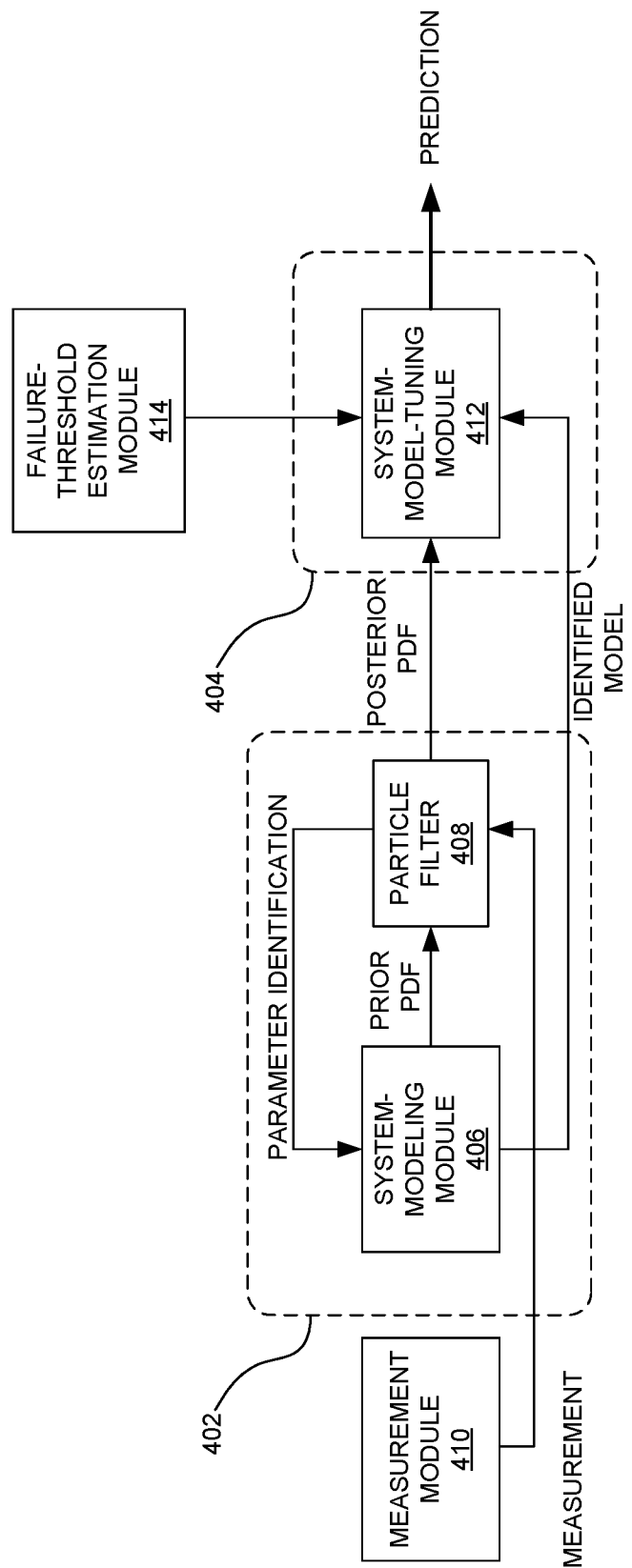
FIG. 4 illustrates an exemplary particle-filtering framework for estimating the remaining useful life (RUL) of a piece of equipment, according to one embodiment.

Various Bayesian inference-based algorithms can be used to estimate the parameters of the aforementioned fatigue accumulation model. Due to the non-linear relationships among the model parameters, particle filters have been used for estimating the model parameters. FIG. 4 illustrates an exemplary particle-filtering framework for estimating the RUL of a piece of equipment, according to one embodiment.

In FIG. 4, RUL-estimation framework 400 can include two stages, state-tracking stage 402 and prediction stage 404. State-tracking stage 402 is for estimating coefficients and damage variables. More specifically, state-tracking stage 402 can include system-modeling module 406 for maintaining the system model. The state vector of the model can be formulated by choosing a set of variables: $x=[D, \alpha, N_L]^T$. The state space model can be described by a state-transition equation $x_{k+1}=f(x_k)+v_{1,k}$, and a measurement equation $r_k=g(x_k)+v_{2,k}$, where $v_{1,k}$ and $v_{2,k}$ are noise terms (e.g., Gaussian distributed noise), $g(x_k)$ represents the electrical network of the material system, $f(x_k)$ represents the physics-based damage accumulation model, and r is the normalized resistance.

State-tracking stage 402 can further include particle filter 408 for estimating the states (i.e., the model parameters). More specifically, particle filter 408 receives measurement results from measurement module 410. For example, measurement module 410 can provide measurements of electrical resistance. Based on the system model and the measurement results, particle filter 408 can output the posterior probability density function (PDF) of the states.

A particle filter can be an effective tool for solving the state/parameter estimation problem. Given a set of noisy measurements (e.g., $Z_{1:t}=\{z(\tau)|\tau=0, 1, \ldots t\}$), particle filters can be used to find the estimation of state x(t), which consists of state variables s(t) and model parameters $\theta(t)$. The probability densities can be represented by continuous PDF, such as $p(x(t)|Z_{1:t})$.

A particle filter can iteratively approximate the posterior PDF as a set:

$$S_k = \{\langle x_k^i, w_k^i \rangle | i = 1, \ldots, n\}$$

$$p(x_k | z_{1:k}) \approx \sum_{i=1}^{n} w_k^i \delta(x_k - x_k^i),$$

where $x_k^i$ is a point in the state space (which includes state variables and model parameters), and $w_k^i$ is an importance weight associated with the point. More specifically, $x:=\{s_1, s_2, \ldots, s_m, \theta_1, \theta_2, \ldots \theta_n\}$. In particle filters, the states can be represented as a PDF, and the algorithm involves sampling the state PDF as a set of particles and associated weights. The system propagates particle values according to the model and updates weights based on measurement results.

Figure 5:
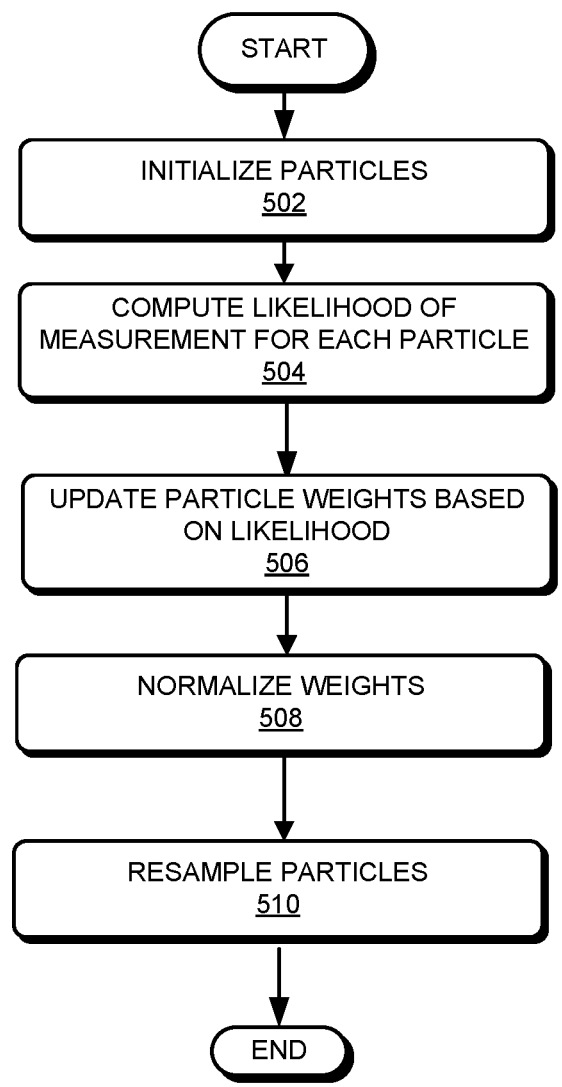
FIG. 5 presents a flowchart illustrating the operation process of a particle filter.

FIG. 5 presents a flowchart illustrating the operation process of a particle filter. The operation starts with initialization of particles (operation 502). More specifically, the system proposes $x_0^i$ and propagates particles. The system computes a likelihood of measurement with respect to each particle (operation 504). For example, the system computes a likelihood function $p(z_k|x_k^i)$ based on state-space equations $x_k^i=f_k(x_{k-1}^i, \omega_k)$, and $z_k=h_k(x_k^i, v_k)$, where $\omega_k$ and $v_k$ denote noise. The system updates particle weights based on likelihood (operation 506) and then normalizes the weights (operation 508). More specifically, the system can compute $w_k^i=w_{k-1}^i p(z_k|x_k^i)$. The system can then resample the particles by keeping the particles with larger weights (operation 510). This process repeats until a convergence is reached.

Returning to FIG. 4, in prediction stage 404 of RUL-estimation framework 400, system-model-tuning module 412 receives an identified model (e.g., a model with fixed model parameters) from state-tracking stage 402 and a failure threshold from failure-threshold estimation module 414. In prediction stage 404, the model parameters are fixed, the system performs run-to-failure simulations using state vectors carried by each particle. The predicted RUL (e.g., represented by $N_f$) can be calculated by taking the weighted average of the predictions from each particle, where the weights are determined in state-tracking stage 402.

Figure 6:
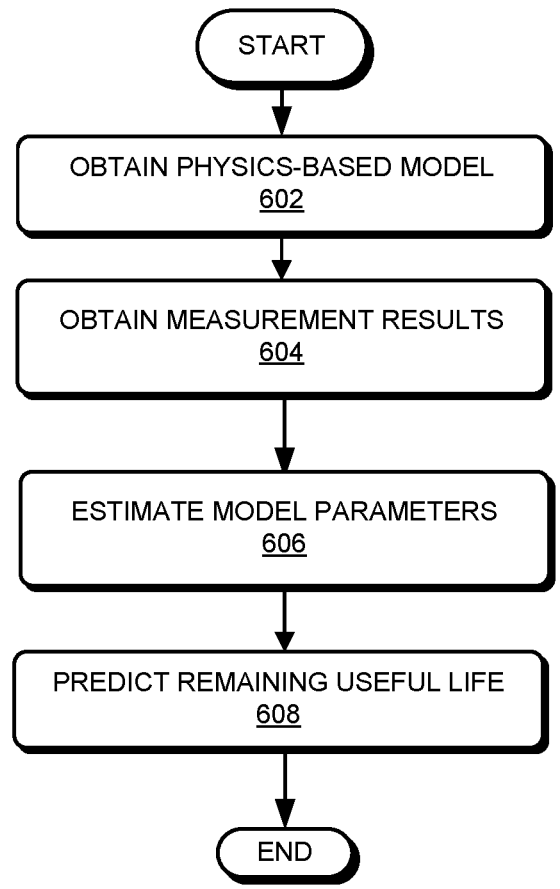
FIG. 6 presents a flowchart illustrating the process for predicting RUL, according to one embodiment.

FIG. 6 presents a flowchart illustrating the process for predicting RUL, according to one embodiment. During operation, the system obtains a physics-based model of the equipment under investigation (operation 602). More specifically, the physics-based model includes both the analytical description of the structure of the various components of the equipment and a semi-physical structural damage accumulation model describing the growth of the damage. More specifically, the model includes both analytical equations derived from one or more known laws of physics (e.g., Newton's Law or Ampere's Law) and semi-analytical equations obtained based on experimental data.

The system obtains measurement results of one or more state variables, also known as observables (operation 604). The measurement can be performed in service. In some embodiments, the system measures at least one conductive property (e.g., electrical, thermal, or magnetic resistance) of the equipment under investigation. The system then uses a particle filter to estimate unknown parameters of the physics-based model (operation 606). Note that a number of particles with various weights can be outputted from the particle filter. The estimated model parameters can include the damage growth rate. The system then runs a simulation to predict the RUL or TUL of the equipment (operation 608). In some embodiments, the system can perform run-to-failure simulations using the state vectors (which can include damage growth rates) carried by each particle, and predict RUL by taking the weighted average of the predictions from each particle. In other words, the system may predict an RUL using a particle, and then compute a weighted average of the RULs for all particles.

In addition to the aforementioned particle-filtering algorithm, other Bayesian inference-based filtering algorithms, such as unscented Kalman filter, can also be used for state tracking and RUL prediction.

An Example

Figure 7A:
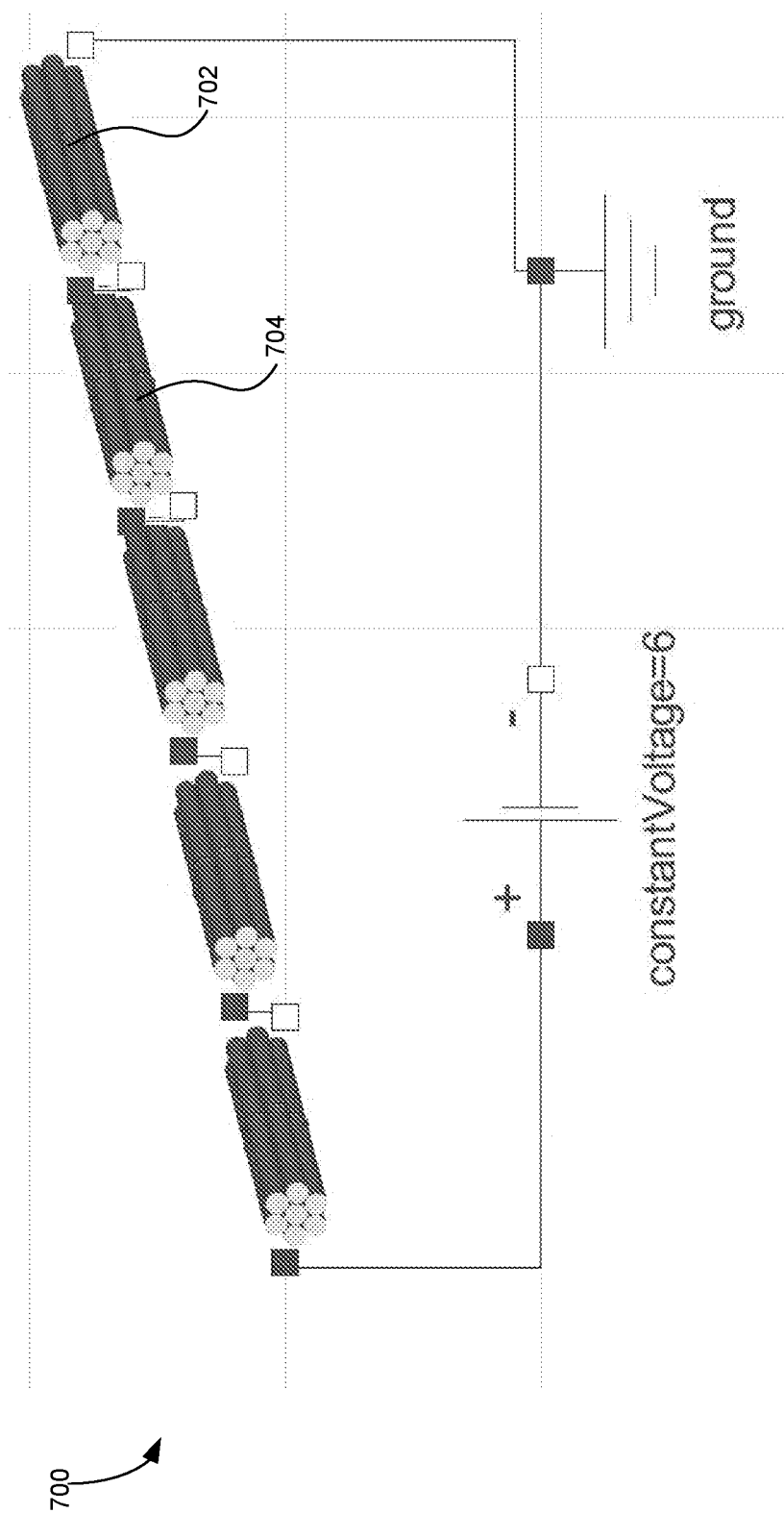
FIG. 7A presents a diagram illustrating a simulation interface for simulating the resistance of a multi-strand cable, according to one embodiment.

FIG. 7A presents a diagram illustrating a simulation interface for simulating the resistance of a multi-strand cable, according to one embodiment. Multi-strand cable 700 can be divided into multiple sections (e.g., sections 702 and 704). Each section can be represented by a unit bundle model.

Figure 7B:
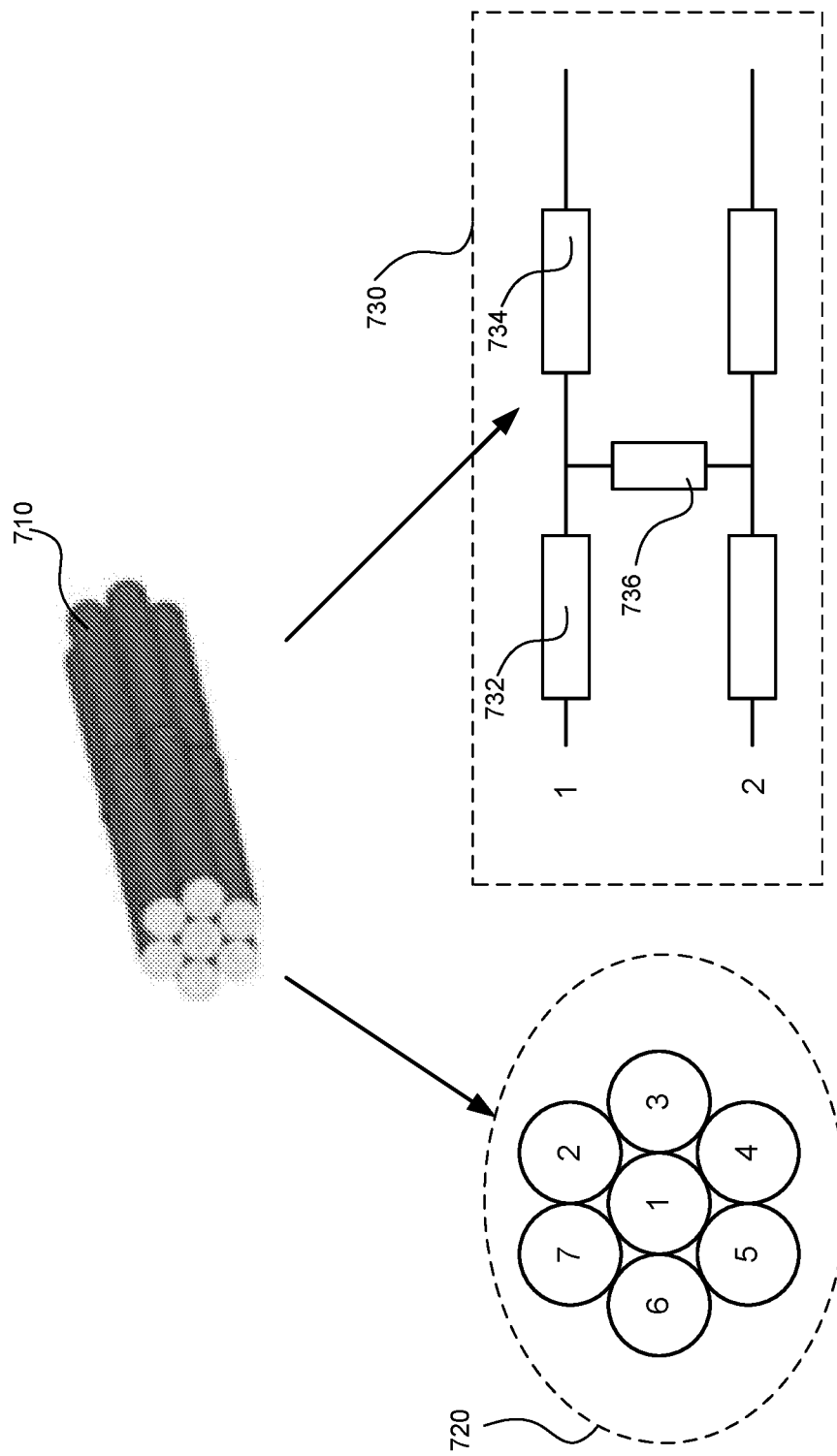
FIG. 7B shows the modeling of a unit bundle, according to one embodiment.

FIG. 7B shows the modeling of a unit bundle, according to one embodiment. In the example shown in FIG. 7B, unit bundle 710 has seven strands, as shown by cross-section 720. Each strand can be represented by a resistor with resistance value calculated from $$R = \frac{\rho L}{A},$$

where $\rho$ is the resistivity, L is the length of the strand and A is the area of the cross-section. As discussed previously, the cross-sectional area is a function of damage variable D. Consequently, the strand resistance is also related to D. The resistivity can be associated with the material of the cable. In some embodiments, the cable can be made of copper, aluminum, or stainless steel. Equivalent circuit 730 models the electrical behavior of two adjacent strands (e.g., strands 1 and 2) of unit bundle 710. More specifically, each strand can include strand resistance (e.g., strand 1 includes strand resistance 732 and 734, and contact resistance (e.g., contact resistance 736) exists between two adjacent strands. Depending on the number of strands and the layout of the multiple strands, a more complicated equivalent circuit model of the unit bundle can be established.

Figure 8A:
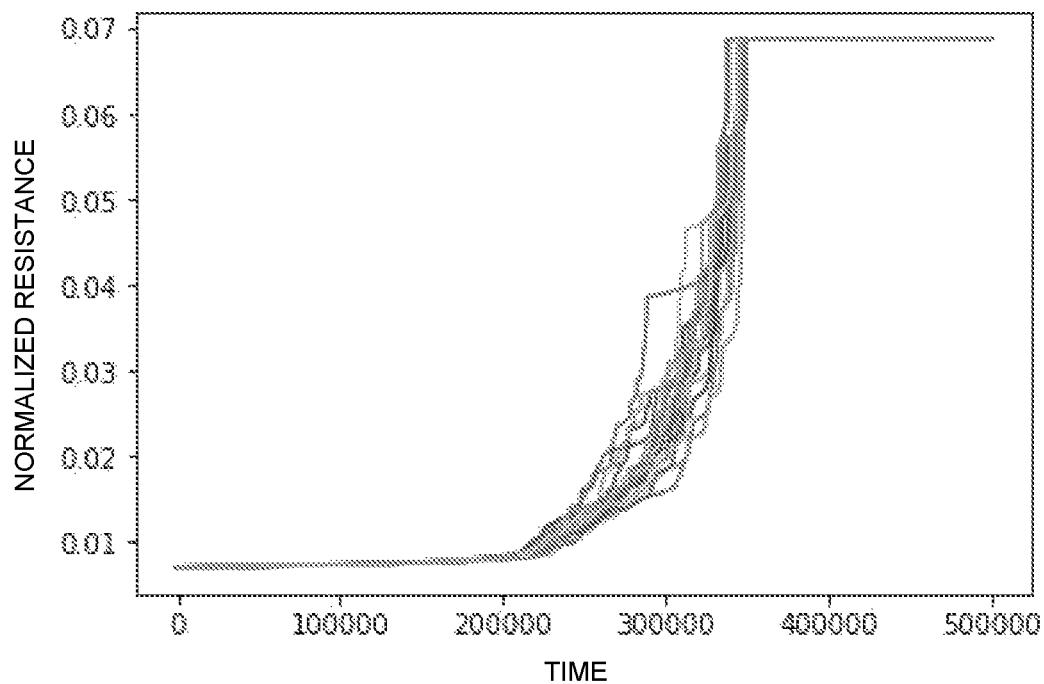
FIG. 8A shows the simulation results of the damage variable of a 28-strand cable as a function of time, according to one embodiment.

A complete model of the multi-strand cable (e.g., multi-strand cable 700) can be accomplished by combining the unit bundle models for all segments of the cable. In the example shown in FIG. 7B, there are 7 strands of cable. In practice, the number of strands in the load-bearing cable can be larger or smaller. In the following example, a cable can include up to 28 strands. FIG. 8A shows the simulation result of the normalized resistance of a 28-strand cable as a function of time, according to one embodiment. In FIG. 8A, the different lines shows the different simulation run and there are 20 runs. The initial wear/damage among the 28 strands can be considered to be randomly distributed. FIG. 8A shows that the trend of the simulation data follows that of the experiments (e.g., measurements). The non-uniform changes in resistance among the different simulation runs are due to the randomized initial damage states.

Figure 8B:
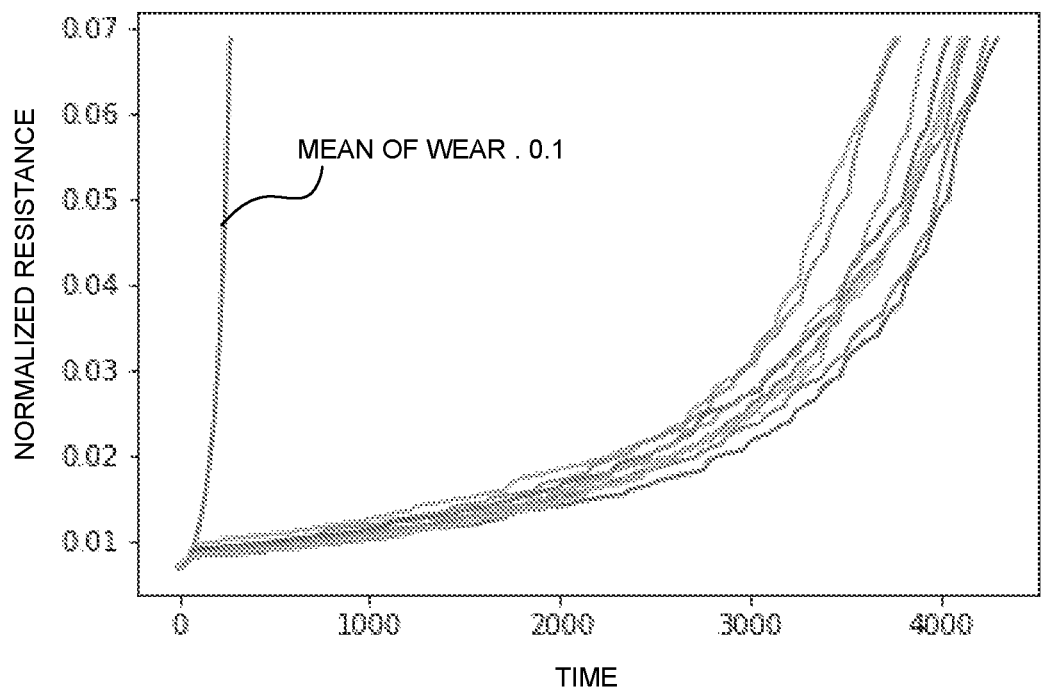
FIG. 8B shows the damage simulation under different initial wear conditions, according to one embodiment.

FIG. 8B shows the simulation outcome under different initial wear conditions, according to one embodiment. More specifically, when running the simulation, the algorithm assumes normal distribution of the initial wear/damage condition among the 28 strands. The 10 simulation results shown in FIG. 8B are for different mean values of the initial wear. More specifically, the mean value of the initial wear has been changed from 0 to 0.1. As one can see from FIG. 8B, when the mean of the initial wear reaches a threshold (e.g., 0.1), the resistance can increase significantly.

Figure 8C:
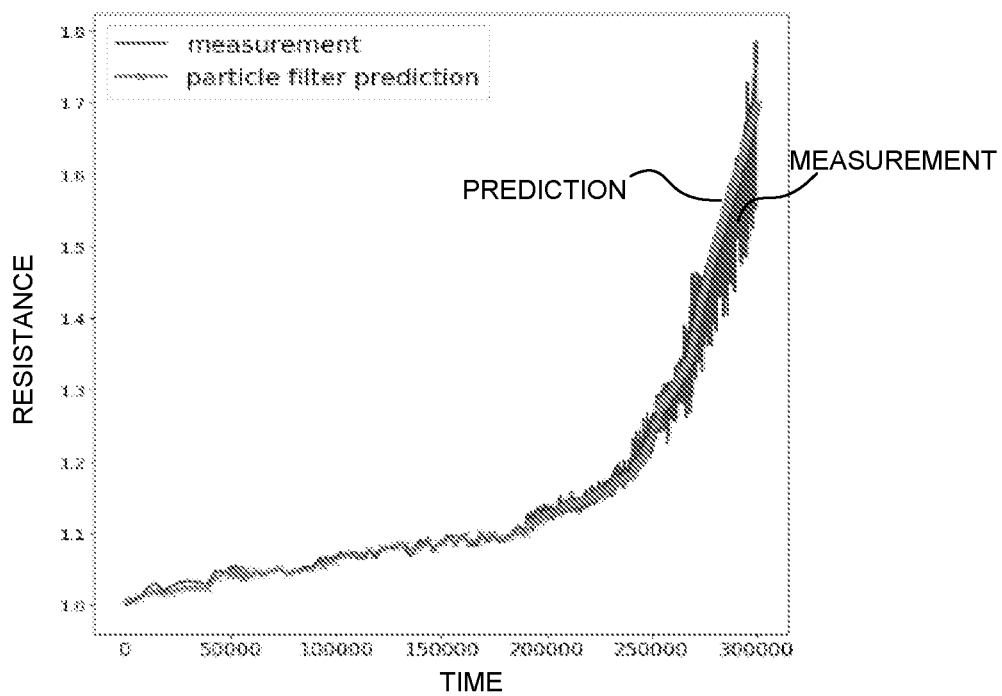
FIGS. 8C-8E show the comparison result between the particle filter predictions and the experimental measurement result, according to one embodiment.
Figure 8D:
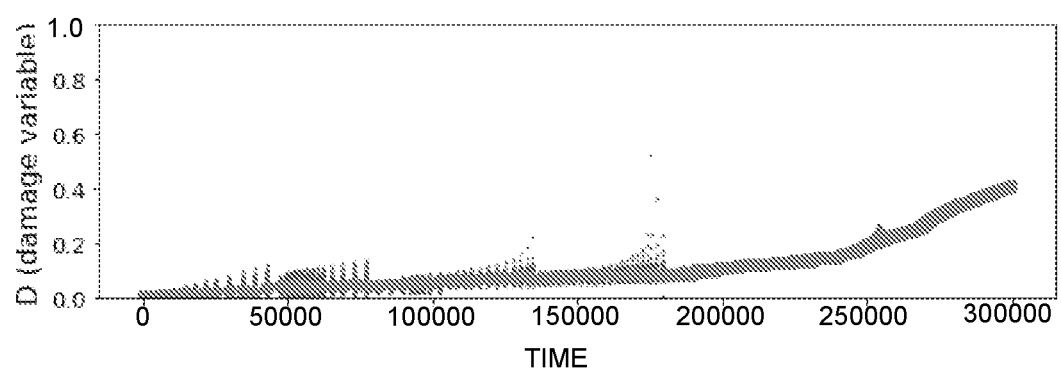
Figure 8E:
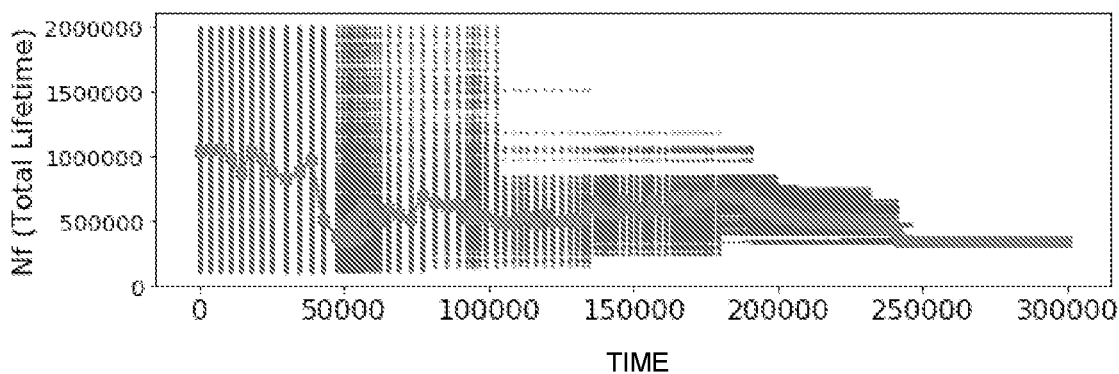

FIGS. 8C-8E show the comparison result between the particle filter predictions and the experimental measurement result, according to one embodiment. More specifically, FIG. 8C shows the predicted normalized resistance and the measurement; the more noisy data is the measurement result, and the less noisy one shows the prediction. FIG. 8D shows damage variable predicted by the particle filter. FIG. 8E shows the total useful life (TUL) predicted by the particle filter. As one can see from FIG. 8E, the prediction of the TUL may show large variations at the initial stage, but tends to converge at the second half of the measurement.

In some embodiments, a functional mock-up unit (FMU)-based approach can be used for model implementation. For example, a Modelica model can be established for the multi-strand cable. Using the Modelica model, the number of strands of the cable and the length of the cable can be changed programmatically.

The structure-based (or physics-based) model (e.g., models shown in FIGS. 7A-7B) can be used for estimating spatially distributed damage (e.g., damage in cables). It can provide the advantage of taking into consideration initial wear of the equipment or structure due to manufacturing defects or handling. Particle-filter based state estimation can also estimate, by Monte Carlo simulations, process noise and the impact of the failure of an individual sub-component (e.g., a cable strand in the multi-strand cable). If stress-strain analysis is integrated in the model, damage propagation can also be simulated. This structure- or physics-based model can be used for quick checks of experimental data.

Exemplary Computer System and Apparatus

Figure 9:
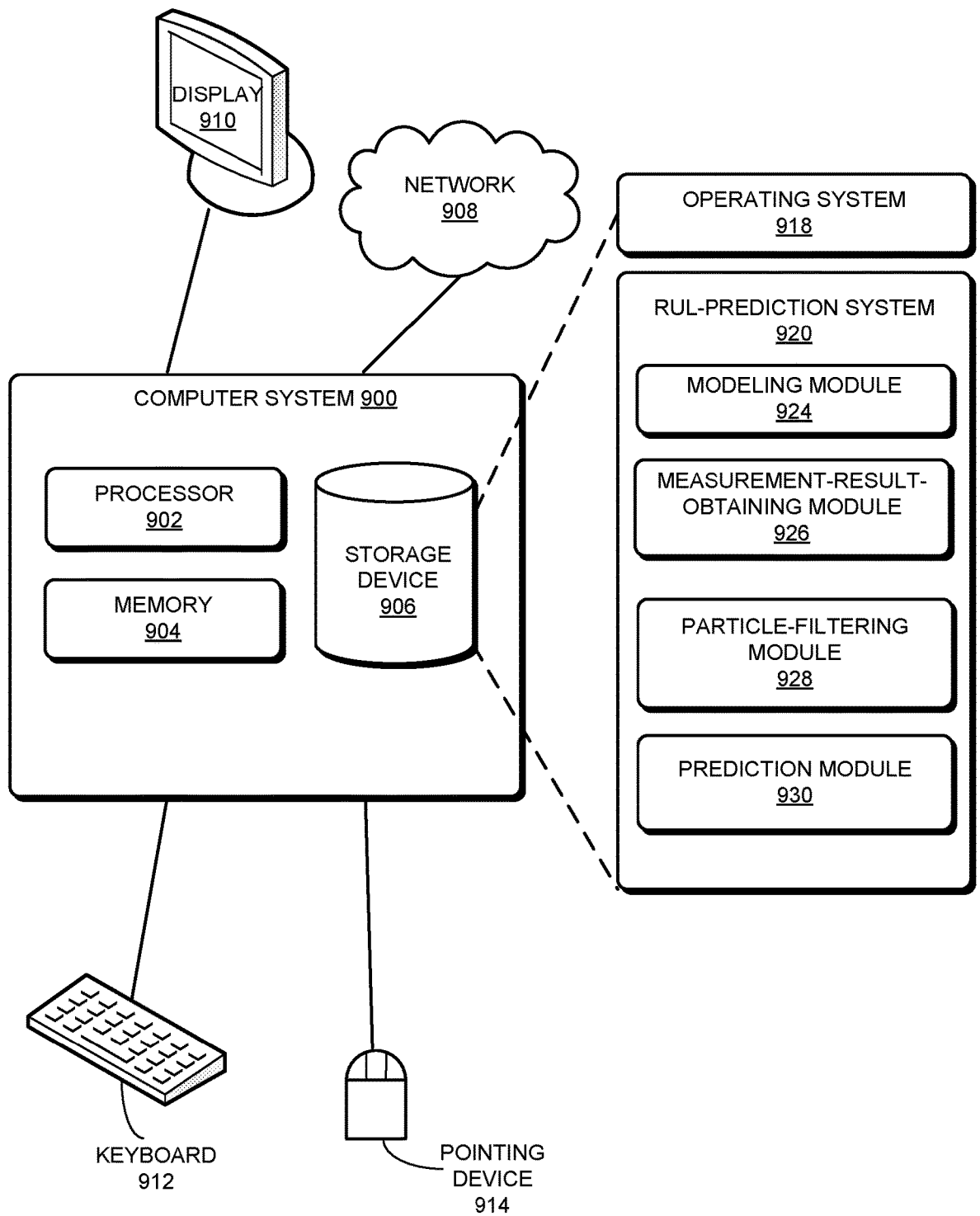
FIG. 9 illustrates an exemplary computer system that facilitates an RUL-prediction system, according to one embodiment.

FIG. 9 illustrates an exemplary computer system that facilitates an RUL-prediction system, according to one embodiment. Computer system 900 includes a processor 902, a memory 904, and a storage device 906. Computer system 900 can be coupled to a display device 910, a keyboard 912, and a pointing device 914, and can also be coupled via one or more network interfaces to network 908. Storage device 906 can store an operating system 918, and an RUL-prediction system 920.

RUL-prediction system 920 can include instructions, which when executed by computer system 900 can cause computer system 900 to perform methods and/or processes described in this disclosure. RUL-prediction system 920 can also include instructions for establishing a physics-based model (modeling module 924) and instructions for obtaining measurement results (measurement-result-obtaining module 926). Furthermore, RUL-prediction system 920 can include instructions for applying a particle filter (particle-filtering module 928) and instructions for predicting the TUL or RUL (prediction module 930).

Figure 10:
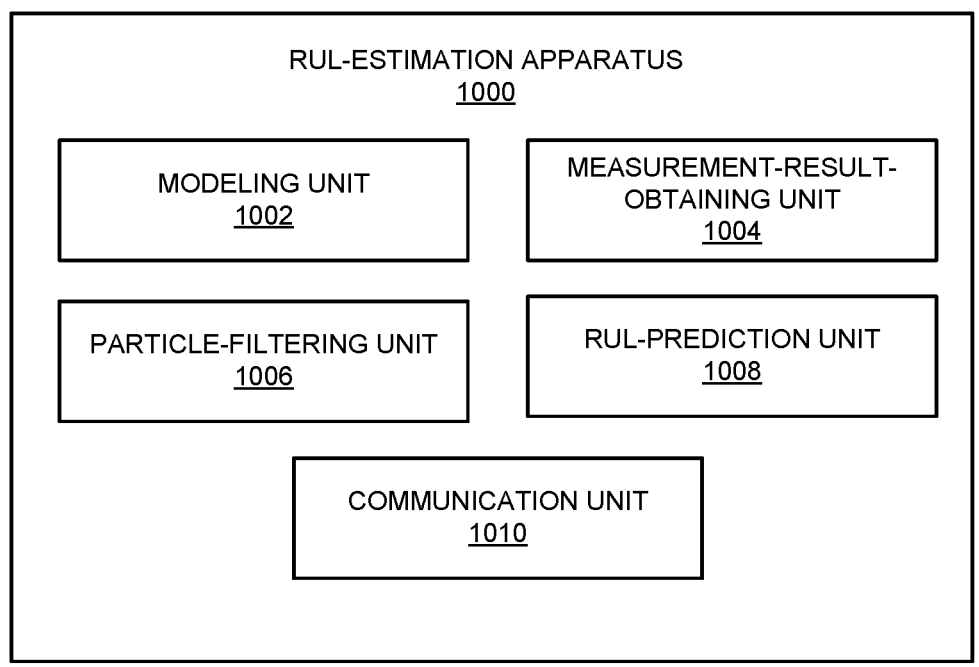
FIG. 10 illustrates an exemplary apparatus that facilitates an RUL-estimation system, according to one embodiment.

FIG. 10 illustrates an exemplary apparatus that facilitates an RUL-estimation system, according to one embodiment. Apparatus 1000 can comprise a plurality of units or apparatuses that may communicate with one another via a wired, wireless, quantum light, or electrical communication channel. Apparatus 1000 may be realized using one or more integrated circuits, and may include fewer or more units or apparatuses than those shown in FIG. 10. Further, apparatus 1000 may be integrated in a computer system, or realized as a separate device that is capable of communicating with other computer systems and/or devices. Specifically, apparatus 1000 can comprise units 1002-1008, which perform functions or operations similar to modules 924-930 of computer system 900 of FIG. 9, including: a modeling unit 1002, a measurement-result-obtaining unit 1004, a particle-filtering unit 1006, and an RUL-prediction unit 1008. Apparatus 1000 can further include a communication unit 1010.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for estimating useful life of a load-bearing structure at least partly made of a conductive material, comprising:

establishing a physics-based damage model for the load-bearing structure, wherein the physics-based damage model comprises an analytical portion modeling known physical properties and internal structures of the load-bearing structure and a semi-analytical portion modeling accumulation of damage;

performing a dynamic measurement to obtain at least one conductive property of the load-bearing structure as a function of fatigue cycles;

estimating parameters of the physics-based damage model based on the measured conductive property; and estimating the useful life of the load-bearing structure based on the estimated parameters of the physics-based damage model.

2. The method of claim 1, wherein the at least one conductive property comprises one or more of: an electrical resistance, a thermal resistance, and a magnetic resistance.

3. The method of claim 1, wherein estimating the parameters of the physics-based damage model comprises applying a Bayesian inference-based filtering algorithm.

4. The method of claim 3, wherein the Bayesian inference-based filtering algorithm comprises a particle-filtering algorithm.

5. The method of claim 1, wherein the estimated parameters of the physics-based damage model comprise a damage variable, a parameter indicating a damage growth rate, and a parameter indicating total useful life.

6. The method of claim 1, wherein the load-bearing structure comprises a load-bearing cable.

7. A computer system, comprising:

a processor; and a storage device coupled to the processor and storing instructions, which when executed by the processor cause the processor to perform a method for estimating useful life of a load-bearing structure at least partly made of a conductive material, the method comprising:

establishing a physics-based damage model for the load-bearing structure, wherein the physics-based damage model comprises an analytical portion modeling known physical properties and internal structures of the load-bearing structure and a semi-analytical portion modeling accumulation of damage;

performing a dynamic measurement to obtain at least one conductive property of the load-bearing structure as a function of fatigue cycles;

estimating parameters of the physics-based damage model based on the measured conductive property; and estimating the useful life of the load-bearing structure based on the estimated parameters of the physics-based damage model.

8. The computer system of claim 7, wherein the at least one conductive property comprises one or more of: an electrical resistance, a thermal resistance, and a magnetic resistance.

9. The computer system of claim 7, wherein estimating the parameters of the physics-based damage model comprises applying a Bayesian inference-based filtering algorithm.

10. The computer system of claim 9, wherein the Bayesian inference-based filtering algorithm comprises a particle-filtering algorithm.

11. The computer system of claim 7, wherein the estimated parameters of the physics-based damage model comprise a damage variable, a parameter indicating a damage growth rate, and a parameter indicating total useful life.

12. The computer system of claim 7, wherein the load-bearing structure comprises a load-bearing cable.

13. A method for monitoring structural damage in a load-bearing structure at least partly made of a conductive material, comprising:

establishing a physics-based damage model for the load-bearing structure wherein the physics-based damage model comprises an analytical portion modeling known physical properties and internal structures of the load-bearing structure and a semi-analytical portion modeling accumulation of damage;

performing a dynamic measurement to obtain at least one conductive property of the load-bearing structure as a function of fatigue cycles; and inferring a state of damage and a damage growth rate by estimating parameters of the physics-based damage model based on the measured conductive property.

14. The method of claim 13, wherein the at least one conductive property comprises one or more of: an electrical resistance, a thermal resistance, and a magnetic resistance.

15. The method of claim 13, wherein estimating the parameters of the physics-based damage model comprises applying a Bayesian inference-based algorithm.

16. The method of claim 15, wherein the Bayesian inference-based filtering algorithm comprises a particle-filtering algorithm.

17. The method of claim 13, wherein the load-bearing structure comprises a load-bearing cable.

\* \* \* \* \*